United States Patent
Urzi et al.

(10) Patent No.: US 8,782,302 B2
(45) Date of Patent: Jul. 15, 2014

(54) METHOD AND APPARATUS FOR ROUTING TRANSACTIONS THROUGH PARTITIONS OF A SYSTEM-ON-CHIP

(75) Inventors: Ignazio Antonino Urzi, Voreppe (FR); Philippe D'Audigier, Crolles (FR); Daniele Mangano, Catania (IT)

(73) Assignees: STMicroelectronics (Grenoble 2) SAS, Grenoble (FR); STMicroelectronics Srl, Agrate Brianza (Milano) (IT)

( * ) Notice: Subject to any disclaimer, the term of this patent is extended or adjusted under 35 U.S.C. 154(b) by 62 days.

(21) Appl. No.: 13/326,991

(22) Filed: Dec. 15, 2011

(65) Prior Publication Data

US 2012/0159017 A1    Jun. 21, 2012

(30) Foreign Application Priority Data

Dec. 16, 2010   (EP) ................................. 10425386

(51) Int. Cl.
G06F 3/00     (2006.01)
G06F 5/00     (2006.01)
G06F 13/00    (2006.01)

(52) U.S. Cl.
USPC ............... 710/36; 710/38; 710/62; 710/64; 710/100; 710/305; 710/306; 710/311; 710/312; 340/2.1; 340/9.1

(58) Field of Classification Search
None
See application file for complete search history.

(56) References Cited

U.S. PATENT DOCUMENTS

| | | | | |
|---|---|---|---|---|
| 5,991,831 | A * | 11/1999 | Lee et al. | 710/33 |
| 6,088,753 | A * | 7/2000 | Sheafor et al. | 710/306 |
| 6,920,519 | B1 * | 7/2005 | Beukema et al. | 710/306 |
| 7,010,607 | B1 * | 3/2006 | Bunton | 709/228 |
| 7,337,300 | B2 * | 2/2008 | Fronte et al. | 711/203 |
| 2003/0158986 | A1 * | 8/2003 | Hong | 710/113 |
| 2004/0085974 | A1 * | 5/2004 | Mies et al. | 370/406 |
| 2004/0085994 | A1 * | 5/2004 | Warren et al. | 370/462 |
| 2004/0172494 | A1 * | 9/2004 | Pettey et al. | 710/305 |
| 2005/0091432 | A1 * | 4/2005 | Adams et al. | 710/100 |
| 2007/0162650 | A1 * | 7/2007 | Bruce | 710/22 |
| 2008/0301256 | A1 * | 12/2008 | McWilliams et al. | 709/214 |
| 2011/0154318 | A1 * | 6/2011 | Oshins et al. | 718/1 |

OTHER PUBLICATIONS

EP Search Report for EP 10425386.9 mailed Dec. 16, 2011 (6 pages).
Ahonen T et al: "Hierarchically Heterogeneous Network-on-Chip", EUROCON, 2007. The International Conference on Computer As a To ol, IEEE, PI, Sep. 9, 2007, pp. 2580-2586.
Joo-Young Kim et al: "A 118.4GB/s multi-casting network-on-chip for real-time object recognition processor", ESSCIRC, 2009. ESSCIRC '09. Proceedings of, IEEE, Piscataway, NJ, USA, Sep. 14, 2009, pp. 400-403.

(Continued)

*Primary Examiner* — Michael Sun
(74) *Attorney, Agent, or Firm* — Gardere Wynne Sewell LLP

(57) ABSTRACT

A node having a node input is configured to receive a plurality of transactions intended for a plurality of different targets. The node has multiple node outputs. At least one target is provided, that target including an input configured to receive a respective output of the node. The node is configured to direct transactions to the at least one target or an output (for passing to a different partition) depending on whether the transactions are intended for the target or a different target. This determination is made in response to a conversion operation which converts a target address of the transaction to an identification associated with the target or the output.

8 Claims, 5 Drawing Sheets

(56) References Cited

OTHER PUBLICATIONS

Plana L A et al: "A GALS Infrastructure for a Massively Parallel Multiprocessor", IEEE Design & Test of Computers, IEEE Service Center, New York, NY, US, vol. 24, No. 5, Sep. 1, 2007, pp. 454-463.

Keun Sup Shim et al: "Static virtual channel allocation in oblivious routing", Networks-on-Chip, 2009. NOCS 2009. 3rd ACM/IEEE International Symposium On, IEEE, Piscataway, NJ, USA, May 10, 2009, pp. 38-43.

* cited by examiner

| R0 | ID1 |
|----|-----|
| R1 | ID2 |
| R2 | ID0 |
| R3 | ID0 |
| R4 | ID2 |
| R5 | ID0 |
| RN | ID0 |

Figure 4a

| R0 | ID0 |
|----|-----|
| R1 | ID0 |
| R2 | ID1 |
| R3 | ID2 |
| R4 | ID0 |
| R5 | ID0 |
| RN | ID0 |

Figure 4b

| R0 | ID0 |
|----|-----|
| R1 | ID0 |
| R2 | ID0 |
| R3 | ID0 |
| R4 | ID0 |
| R5 | ID1 |
| RN | ID2 |

METHOD AND APPARATUS FOR ROUTING TRANSACTIONS THROUGH PARTITIONS OF A SYSTEM-ON-CHIP

PRIORITY CLAIM

This application claims priority from European Application for Patent No. 10425386.9 filed Dec. 16, 2010, the disclosure of which is hereby incorporated by reference.

TECHNICAL FIELD

The present invention relates to an arrangement and particularly but not exclusively to an arrangement in a partition of a system on chip.

BACKGROUND

Integrated circuits have an ever increasing number of components on them. A System-on-Chip (SoC) provides multiple computer components or in some cases entire electronic systems on a single chip. Further, modern SoCs in application domains integrate several peripherals in order to meet the requirements of a wide range of applications. The level of integration is being increased by the usage of smaller silicon feature technology, for example at the moment 32 nanometers.

SUMMARY

According to an aspect, there is provided an arrangement comprising a node having a node input configured to receive a plurality of transactions intended for a plurality of different targets, said node having a plurality of node outputs; at least one target, said at least one target comprising an input configured to receive a respective output of said node; an output, wherein said node is configured to direct said transactions to one of said at least one target and said output depending on if said transactions are intended for said at least one target or at least one different target.

According to another aspect, there is provided a method comprising receiving a plurality of transactions intended for a plurality of different targets, said node having a plurality of node outputs, at least one node output providing an input to a target and at least one output providing an input to a further node; directing said transactions to a respective one of said node outputs depending on if said transactions are intended for said at least one target or at least one different target which is downstream of said further node.

According to another aspect, a first partition of a system-on-chip includes: a first output node coupled to a bus; a first plurality of peripherals; a first address-to-identification converter operable to convert a target address of a transaction to a first identification associated with said address, said first identification either specifically identifying one of the first plurality of peripherals in the first partition as the target of the transaction or generally identifying a peripheral target outside of the first partition as the target of the transaction; and a first routing node configured to receive both the transaction and the first identification, the first routing node operable to route the received transaction based on the received identification to: (a) one of the first plurality of peripherals when the first identification is one of the first plurality of peripherals in the first partition or (b) said first output node when the first identification is a peripheral target outside of the first partition.

BRIEF DESCRIPTION OF THE DRAWINGS

Some embodiments will now be described by way of example only to the accompanying drawings in which:

FIGS. 4a to c show address to identifier conversion tables of respective address to identifier converters of the respective partitions of FIG. 3.

DETAILED DESCRIPTION OF THE DRAWINGS

Figure 1:
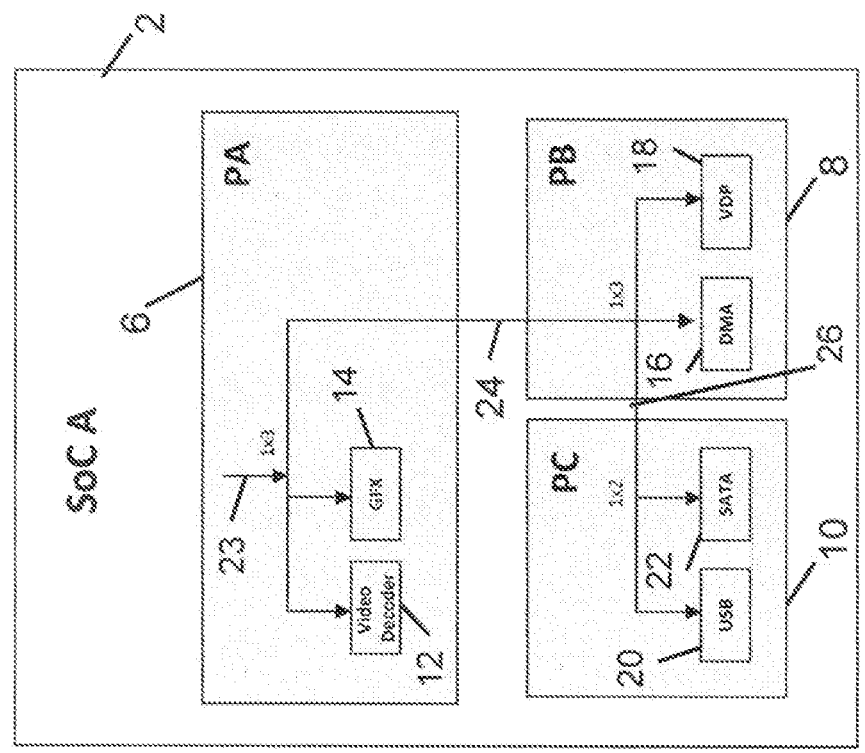
FIG. 1 schematically shows a first system on chip design.

Reference is made to FIG. 1. FIG. 1 shows a first system on chip 2. The first system on chip 2 comprises a first partition 6, a second partition 8 and a third partition 10. The partitions may be physical partitions in the silicon of the integrated circuit or any other suitable segregation of the system on chip. The partitions may be conceptual in some embodiments and are used to subdivide the SoC into different blocks. The partitions each comprise one or more peripherals. In the case of the first partition 6, a video decoder 12 provides a first peripheral and a GFX (graphic effect) 14 provides a second peripheral. The second partition 8 comprises a first peripheral in the form of a DMA (direct memory access) 16 and a second peripheral VDP (video display processor) 18. The third partition 10 has a first peripheral USB (universal serial bus) 20 and a second peripheral SATA (serial advanced technology attachment) 22.

Interconnect 23, part of the peripheral bus of the system on chip, is arranged in the first partition to connect or couple to the video decoder 12 and the GFX 14 to an interconnect 24. The interconnect 24, which is also part of the peripheral bus of the system on chip, connects or couples the first partition 6 and the second partition 8. The interconnect 24 connects or couples to the DMA 16 and, the VDP 18 and to another interconnect 26, which again is part of the peripheral bus. The interconnect 26 connects or couples the second partition 8 and the third partition 10. The interconnect 26 is connected or coupled to the USB 20 and SATA 22.

As can be seen, the partitions are daisy chained together. The first partition connects to the second partition which connects to the third partition. This is to minimize the interpartition routing.

Figure 2B:
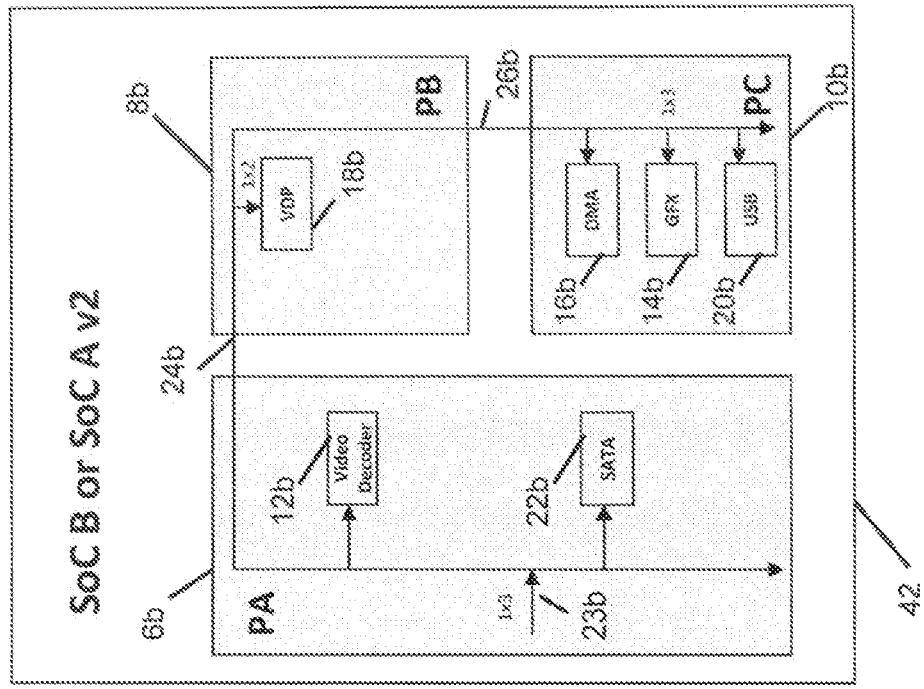
FIG. 2b shows a second system on chip design, which is a modification of the first system on chip design, where the peripheral bus has been redesigned.
Figure 2A:
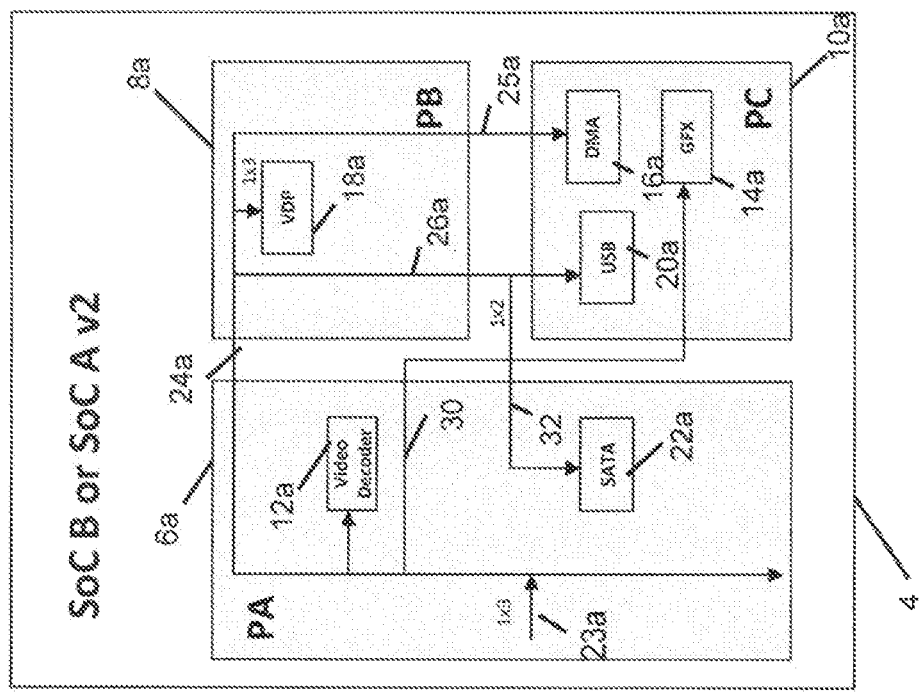
FIG. 2a shows a second system on chip design, which is a modification of the first system on chip design and retains the same peripheral bus.

FIG. 2a shows a second system on chip where some redesign of the system on chip of FIG. 1 has taken place. This system on chip 4 has a first partition 6a, a second partition 8a and a third partition 10a. The first partition 10a has a video decoder 12a and a SATA 22a. The second partition has a VDP 18a. The third partition has a USB 20a, a DMA 16a and a GFX 14a. Thus, as compared to the system on chip of FIG. 1, some peripherals have moved to different partitions. The peripheral bus has however continued to have the same routing with respect to the peripherals, as shown in FIG. 1. Thus, a first interconnect 23a on the first partition is connected to the video decoder 12a of the first partition, the GFX of 14a of the third partition via connection 30 and via interconnect 24a to the second partition. It should be appreciated that in order to have the connection to GFX 14a, the connection 30 is a new connection between the first partition 6a and the third partition 10a.

Similarly, peripheral bus 24a is connected to VDP 18a on the second partition and also to DMA 16a on the third partition. To achieve this, an additional connection 25a is provided between the second partition 8a and the third partition 10b. Finally, interconnect 26a is provided between the second partition and the third partition as in FIG. 1. In order that interconnect 26a is connected to SATA 22a on the first peripheral device, an additional interconnect 32 is provided between the second partition 8a and the first partition 6a. The interconnect 26a is connected to USB 20a on the third partition 10a. Thus, the same peripheral bus pattern as shown in FIG. 1 is used but where a peripheral device has changed from one partition to another, additional routing is added to the peripheral bus. Increased inter-partition routing is undesirable as this increases the complexity of the integrated circuit and is undesirable from a physical layout perspective.

FIG. 2b shows an alternative to the arrangement of FIG. 2a where the system on chip of FIG. 1 again is again redesigned. It should be appreciated that the system on chip of FIG. 2a is the same as the system on chip of FIG. 2b but the routing provided is different. The system on chip 42 shown in FIG. 2b comprises a first partition 6b with a video decoder 12b and a SATA 22b. A second partition 8b comprises a VDP 18b. A third partition 10b is provided with a DMA 16b, a GFX 14b and a USB 20b.

As can be seen, the peripherals have been rearranged in the same manner as shown in FIG. 2a. However, instead of maintaining the peripheral bus arrangement of FIG. 1, the peripheral bus arrangement has been redesigned. Accordingly, there is an interconnect 24b between the first partition 6b and the second partition 8b. There is an interconnect 26b between the second partition 8b and the third partition 10b. However, this has required the peripheral bus to be redesigned or requires a system on chip memory map to be altered. Thus, the interconnect 23b on the first partition 6b is now connected to SATA 22b, video decoder 12b and the interconnect 24b. The interconnect 24b is connected to VDP 18b and interconnect 26b. The interconnect 26b is thus connected to DMA 16b, GFX 14b and USB 20b. Thus, although the arrangement of FIG. 2 is advantageous in that the number of interconnects between partitions is reduced or minimized, this makes the reuse of designs more complex and involves more design time.

Figure 3:
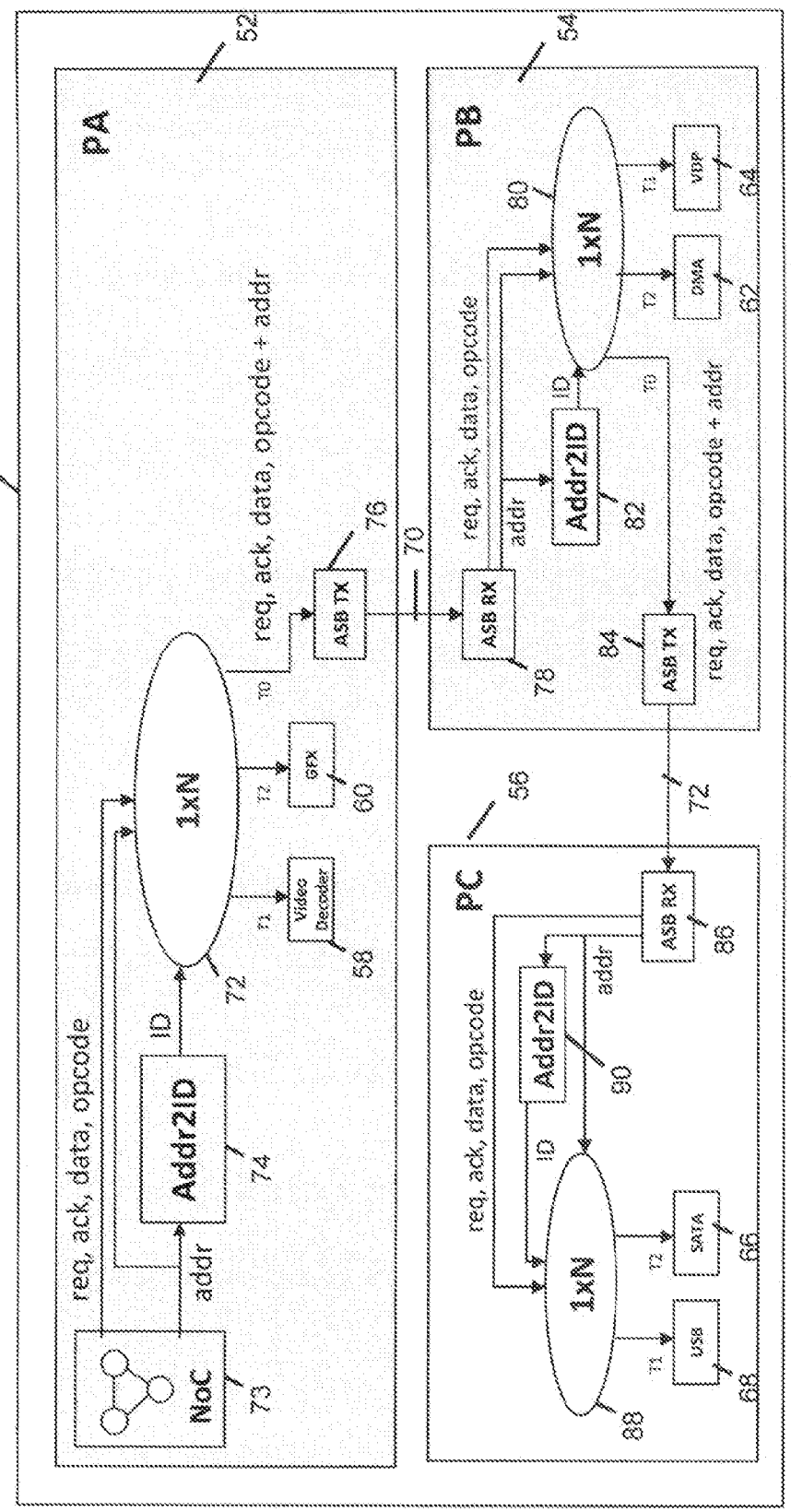
FIG. 3 shows a schematic view of a system on chip in an embodiment.

Reference is made to FIG. 3 which shows an embodiment. FIG. 3 shows a system on chip 50 which has a first partition 52, a second partition 54 and a third partition 56. The first partition comprises a video decoder 58 and a GFX 60. The second partition 54 comprises a DMA 62 and a VDP 64. The third partition 56 comprises a SATA 66 and a USB 68. The first partition is connected to the second partition 54 via a peripheral bus 70. The second partition 54 is connected to the third partition 56 via a peripheral bus 72. Thus, in the embodiment shown in FIG. 3, the partitions are daisy chained together, thus removing any issue of routing complexity.

The first partition is provided with a node 72. The node 72 is arranged to receive a transaction which is to be passed to one of the peripheral units of the system on chip. The transactions may be received from an NoC (Network on Chip) source 73. The transaction information is input to the node 72. This transaction information can include one or more of the following: data, opcode, request, acknowledgement or any other suitable information.

The node 72 is also arranged to receive an output from the address to ID converter 74.

This address converter 74 is configured to receive the address associated with the transaction. The address is also provided to the node. The address generator 74 is configured to output an ID associated with that address. The address is the address of the target peripheral (defining a particular location in that target) and is part of the data transaction. For the transactions intended for a peripheral, the address needs to be associated with the transaction. The function of the address converter 74 will be described in more detail later.

The node 72 is arranged to have a first connection to the video decoder 58, a second connection to the GFX 60 and a third connection to a transmitter 76. The output of the transmitter 76 comprises the peripheral bus 70. The peripheral bus 70 is input to a receiver 78 on the second partition 54. The output of the receiver 78 is input to a second node 80. In particular, the receiver 78 is arranged to output the address to an address converter 82, similar to the address converter 74 of the first partition as well as to the second node. The output of the second address converter is an identifier ID which is input to the second node 80. The remaining part of the transaction is, as with the first node, output by the receiver 78 to the second node.

The node 80 is connected the VDP 64, the DMA 62 and to a transmitter 84 on the second partition. The transmitter on the second partition is connected to a receiver 86 on the third partition. The receiver 86 on the third partition is connected to a third node 88 in the partition. This third node is similar to or the same as the first and second nodes. The receiver 86 is also connected or coupled to an address converter 90 on the third partition. This is similar to or the same as the address convertor of the other partitions. The output of the address converter 90 is input to the third node and provides ID information. The address is also provided to the third node. The receiver provides the remainder of the transaction including the request, ACK, data and opcode. The third node 88 is connected to the USB 68 and the SATA 66.

The address converter 74 of the first partition 52 is arranged to assign an identifier to each transaction based on the target address of the transaction. In the example shown in FIG. 3, there are three possible IDs which can be assigned to each transaction. The first ID T1 is assigned to any transactions which are intended for the video decoder 58. The second ID T2 is assigned to any transactions which are for the GFX 60. Both the video decoder 58 and the GFX 60 are in the same partition as the ID generator 74. The third ID T0 is assigned for any transaction which is intended for a peripheral which is not on the first partition 52.

Thus, the ID is associated with the data transaction to the node. In one embodiment, the transaction including the address is modified to additionally include an ID. As mentioned previously, the address is input to the node. Based on the ID, the node 72 will route the transaction (including the address) to one of its three outputs. For those transactions which are intended for peripherals which are not on the first partition 52, the address information is used to make sure that the transaction reaches its correct destination. The ID is used by node 72 to control to which output the transaction is routed. Accordingly, the ID may not be included in any of the outputs of the node 72.

FIG. 4a shows the routing table used by the address generator 74. As can be seen, transactions are received which specify an address. R0, R1, etc are the regions of the SoC memory map. The address for a given transaction will be in one of the regions. Each target occupies a memory region in the SoC memory map. The list of regions may be the same on all address converters. Only a subset of regions corresponds to real targets present on each partition. So for the first partition, the region R0 corresponds to video decoder, R1 corresponds to GFX.

R0 is for the video decoder 58 and accordingly is assigned ID 1 (T1). R1 is intended for the GFX 60 and accordingly is assigned ID 2 (T2). R4 is for the GFX 60 and assigned ID2 (T2). However, R2, R3, R5 and RN are for peripherals which are outside the first partition and are thus given ID 0 (T0). Thus, the ID generator 74 is arranged to determine the ID on the basis of the target address included the transaction.

The address converter 82 on the second partition operates in the same way as the ID converter 74 of the first partition. Likewise, the second node operates in a similar manner to the first node. In particular, the address converter 82 is configured to assign ID 1 (T1) to all transactions which are intended for the VDP 64. ID 2 (T2) is assigned to all transactions intended for the DMA 62. ID 0 (T0) is assigned to all transactions which are intended for the peripherals on the first and third partition 56. Thus, the second node is arranged to output the transactions including the address but without the ID to the transmitter 84. Those transactions which are intended for the peripherals on the third partition are thus transmitted via the transmitter 84 to the receiver 86. The receiver 86 thus provides the transactions to the node 88 and the addresses are provided to the ID converter 92. The address converter 92 provides the ID 1 (T1) for those transactions which are required for the USB 68 and the ID 2 (T2) for those transactions which are for the SATA 66.

Reference is made to FIG. 4b which shows the routing table for the address converter 82. R0, R1, R4, R5 and RN are all for the peripherals on the first and third partitions and are thus assigned ID0 (T0). R2 intended for the VDP 64 and is assigned ID 1 (T1). R3 is for the DMA 62 and is assigned ID 2 (T2).

Finally, FIG. 4c shows the routing table of the address converter 90 of the third partition. As can be seen R0, R1, R2, R3, R4 are for targets on the first and second partitions and R5 is for the USB 68 and thus assigned ID 1 (T1). RN is for the SATA 66 and thus assigned ID 2 (T2). In summary, R0 and R1 are for the peripherals on the first partition, R2 and R3 are for the peripherals on the second partition and R4 and RN are for the peripherals on the third partition.

Thus embodiments of the present invention allow easier reusability and simpler design. This may minimize the time to market and reduce the design costs. It should be appreciated that the examples shown in the figures show six peripherals. In practice, more or less than six peripherals may be provided. Further the number of peripherals on a partition can be anything from none to as many as can be physically accommodated.

In some embodiments of the invention, the simplified design of the peripheral bus may make an impact on the overall system on chip time development.

The peripheral bus provided by some embodiments is reusable in different systems on chip. Such a peripheral bus may be agnostic as compared to the physical aspect. Some embodiments allow the peripheral bus to share the same memory map across different system on chips. This is regardless as to the organization of the peripherals on the physical partitions. Embodiments of the present invention may avoid the need to respin the peripheral bus where there is physical partition reorganization. Further, embodiments of the present invention allow the simplicity of the daisy chaining peripheral bus to be maintained, at least in some embodiments.

Embodiments of the present invention allow asynchronous communication between the partitions.

In some embodiments, the nodes 72, 80 and 88 may have the same structure. In some embodiments of the present invention, the nodes may have different structures and the number of outputs may differ from partition to partition.

It should be appreciated that in one embodiment, the transactions are received from a network on chip NoC or any other suitable source.

Figure 5:
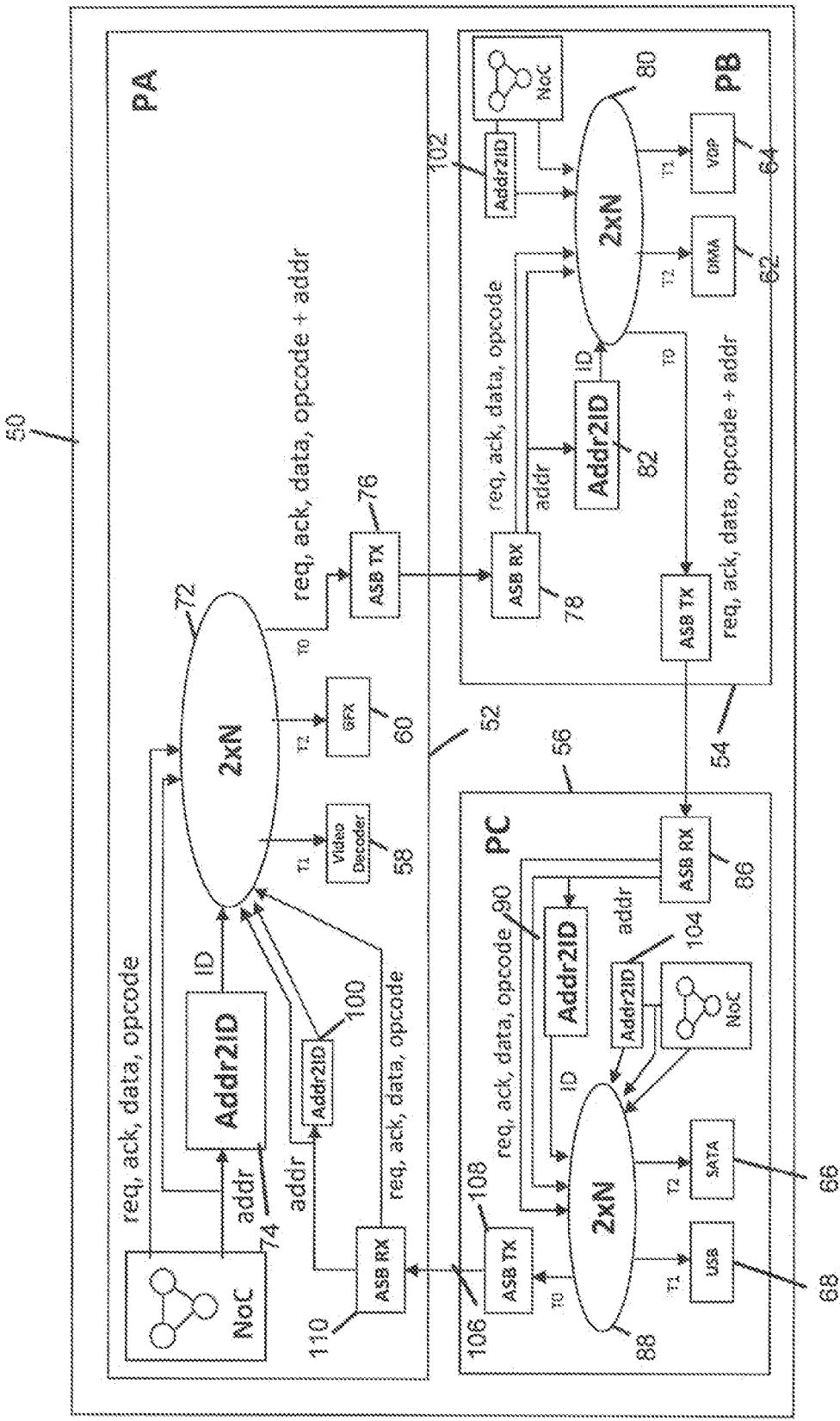
FIG. 5 shows a modification to the system on chip of FIG. 3.

Reference is made to FIG. 5 which shows a modification of the embodiment of the system on chip shown in FIG. 3. In addition to the elements shown in FIG. 3, each partition is provided with a second address to identifier converter 100, 102 and 104 respectively. Each address to identifier converter is configured to receive transactions from, for example, a NoC or any other suitable source. These transactions are treated in the same way at the transactions received in the embodiment of FIG. 3. The address is input to the address to ID converter and the respective node. The rest of the transaction is input to the respective node. The associated identifier is output by the respective address to ID converter to the node. The node will treat all the transactions it receives in the same manner as described previously.

In one modification, the peripheral bus may have an interconnect 106 from the third partition to the first partition. A transmitter 108 may be provided on the third partition which is configured to output transactions on the interconnect 108 which are received by a receiver 110 on the first partition. Thus the partitions are connected in a ring.

Each of the address to ID converters on each partition is configurable. Each table represents the system on chip memory map or a subset of the memory map related to that partition. This may be reconfigurable by for example software, an on chip table or a fixed table at the design stage.

It should be appreciated that some embodiments may use asynchronous bridges on the boundary partitions and may have a four-phase handshake based frequency converter. In some embodiments, the physical address is not decoded, it is carried up to the final target or a next address to ID converter.

Each address to ID converter may implement the system on chip memory or just the subset related to that partition. This may minimize the decoding time. Any address corresponding to a target not sitting in a given partition is remapped to a particular identifier and then transferred to the address converter of the next partition. This may minimize latency accesses. It should be appreciated that this table is distributed. In other words, a table is provided in each of the partitions. This means that there may be high scalability and frequency.

Embodiments of the present invention may provide for a compatible memory map amongst different system on chips. The peripheral bus may not be linked to any particular physical constraints. The peripheral bus may be shared amongst different system on chips. Thus, only the address to identifier converter has to be reconfigured. Embodiments of the present invention may have a regular structure in that the same building blocks are used: a node is used and the memory mapping is agnostic since embodiments use ID routing.

In embodiments of the present invention, the need to respin the peripheral bus in the case of a physical partition reorganization may be removed. Only the address to ID converter needs to be reconfigured. Again, there is no need to respin the peripheral bus in the case of memory map changes as the address to ID converter simply needs to be reconverted.

There is an asynchronous interface between the physical partitions as there is no top level timing to analyze. Further, no inter-partition clock balancing needs to be addressed.

The peripherals mentioned are by way of example and any other suitable peripherals may be used. The number of partitions may be more or less than three.

Embodiments may be used for any suitable chip. By way of example only, embodiments may be used with any suitable system on chip application domains such as TV, mobile communication and multimedia. For example some embodiments may have application to HDTV or 3DTV.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. An apparatus, comprising:
    a system-on-chip including a plurality of partitions coupled together by at least one peripheral bus such that the plurality of partitions are daisy chained together, wherein each partition comprises:
        a routing node having a node input configured to receive a plurality of transactions intended for a plurality of different target peripheral devices, each transaction including a target peripheral device address which specifically identifies one of the target peripheral devices within the system-on-chip, said routing node having a plurality of node outputs, wherein each node output is identified by a corresponding output identifier and wherein the node outputs include a first output coupled to another partition by the peripheral bus and a second output;
        at least one target peripheral device located within the partition, said at least one target peripheral device comprising an input coupled to the second output of said routing node; and
        an address converter configured to convert the target peripheral device address associated with each transaction to an output identifier for application to said routing node, said output identifier comprising a first identifier if the target peripheral device address is for a target peripheral device located on another partition and comprising a second identifier if the target peripheral device address is for said at least one target peripheral device located within the partition;
        wherein said routing node is configured to route said received transactions to the first and second outputs of the routing node whose output identifier corresponds to said first and second identifiers received from the address converter.

2. The apparatus of claim 1, wherein said address converter comprises a mapping table configured to provide a mapping between said target peripheral device address and said output identifier.

3. The apparatus of claim 1, wherein said address converter comprises a plurality of address converters, each of said plurality of address converters being configured to provide said output identifier to said routing node.

4. The apparatus of claim 3, wherein said plurality of transactions are received from a first source and a second source, said transactions from said first source processed by a first of said address converters and said transactions from said second source processed by a second of said address converters.

5. The apparatus of claim 1, wherein said node output comprises a transmitter configured to receive routed transactions and output said transactions to said peripheral bus.

6. The apparatus of claim 1, wherein said node output comprises a transmitter configured to receive transactions and output said transactions to said peripheral bus, and wherein the plurality of partitions includes a further partition comprising a receiver configured to receive said transactions from said peripheral bus and to provide said transactions to said node input of said routing node of said further partition.

7. The apparatus of claim 1, wherein said partitions are connected together in a ring.

8. A system, comprising:
    a first partition of a system-on-chip, said first partition including a first plurality of peripheral devices;
    a second partition of said system-on-chip, said second partition including a second plurality of peripheral devices;
    a bus connecting said first and second partitions in a daisy chain;
    wherein said first partition further includes:
        a routing node having a first output coupled to one of said first plurality of peripheral devices and a second output coupled to the second partition through said bus;
        an address-to-identification converter configured to convert a target peripheral device address of a transaction to an output identification;
        wherein said routing node further receives said transaction and output identification, said routing node configured to output said transaction to the first output if said output identification has a first value corresponding to the first output and output said transaction to the second output if said output identification has a second value corresponding to the second output;
        wherein said first address-to-identification converter assigns the output identification the first value associated with the first output if the target peripheral device address is an address of said one of said first plurality of peripheral devices and assigns the output identification the second value associated with the second output if the target peripheral device address is an address of one of said second plurality of peripheral devices in said second partition.

* * * * *